United States Patent [19]

Gaughan et al.

[11] Patent Number: 6,073,171
[45] Date of Patent: Jun. 6, 2000

[54] TWO-WAY COMMUNICATION PROTOCOL FOR A WEB TELEVISION

[75] Inventors: Kevin J. Gaughan, Arlington Heights; Thomas J. Zato, Inverness, both of Ill.

[73] Assignee: Zenith Electronics Corporation, Glenview, Ill.

[21] Appl. No.: 08/787,660

[22] Filed: Jan. 23, 1997

[51] Int. Cl.[7] .................................................... H04N 7/10
[52] U.S. Cl. .............................. 709/219; 345/328; 348/13
[58] Field of Search ..................................... 345/327, 328; 709/217–219; 348/12, 13, 7, 565; 455/4.2, 5.1

[56] References Cited

U.S. PATENT DOCUMENTS

| | | | |
|---|---|---|---|
| 5,774,666 | 6/1998 | Portuesi | 395/200.48 |
| 5,818,441 | 10/1998 | Throckmorton | 345/328 |

FOREIGN PATENT DOCUMENTS

| | | | |
|---|---|---|---|
| WO 97/33434 | 12/1997 | WIPO | H04N 7/00 |

OTHER PUBLICATIONS

"Internet" from Sony; Sep. 1996.

*Primary Examiner*—Victor R. Kostak

[57] ABSTRACT

A web television includes (i) a display, (ii) an internet module for supporting internet communications between the web television and internet content providers, (iii) a PIP module for providing a PIP area of the display, (iv) a video processor module for supplying video to the display, (v) an audio processor module for supplying audio to a speaker of the web television, (vi) an video/audio switch for switching outputs from a tuner of the web television and from the internet module between the PIP module, the video processor, and the audio processor, (vii) a television controller, and (viii) a two-way communication bus interconnecting the internet module, the PIP module, the video processor module, the audio processor module. The television controller controls the internet module, the PIP module, the video processor module, the audio processor module, and the video/audio switch so as to selectively display the internet communications and television signals on the display. The television controller also transmits messages to, and to receive messages from, the internet module over the two-way communication bus.

55 Claims, 5 Drawing Sheets

Figure 3

| TV | Start | Slave Address $44 | | Command $00 | | Mode Byte | | Request Byte | | Stop |
|---|---|---|---|---|---|---|---|---|---|---|
| IM | | | ACK | | ACK | | ACK | | ACK | |

Figure 4

| TV | Start | Slave Address $44 | | Command $01 | | IR Data Page $09 | | IR Data Byte | | Stop |
|---|---|---|---|---|---|---|---|---|---|---|
| IM | | | ACK | | ACK | | ACK | | ACK | |

Figure 5

| TV | Start | Slave Address $44 | | Command $01 | | IR Trakball X-Y Position Page $14 | | X Position | | Y Position | | Stop |
|---|---|---|---|---|---|---|---|---|---|---|---|---|
| IM | | | ACK | | ACK | | ACK | | ACK | | ACK | |

Figure 6

| TV | Start | Slave Address $44 | | Command $01 | | IR Keyboard Page $15 | | Last IR Key | | Current IR Key | | Stop |
|---|---|---|---|---|---|---|---|---|---|---|---|---|
| IM | | | ACK | | ACK | | ACK | | ACK | | ACK | |

Figure 7 (100)

| | Start | Slave Address $44 | ACK | Command $03 | ACK | Software Revision # | ACK | Software Version # | ACK | Stop |
|---|---|---|---|---|---|---|---|---|---|---|
| TV | | ✓ | | ✓ | | | | | | ✓ |
| IM | | | ✓ | | ✓ | | ✓ | | ✓ | |

Figure 8 (110)

| | Start | Slave Address $45 | ACK | Status $00 | ACK | Mode Byte | ACK | Status Byte | ACK | Request Byte | ACK | Checksum | H-I-G Stop |
|---|---|---|---|---|---|---|---|---|---|---|---|---|---|
| TV | | ✓ | | | | ✓ | | ✓ | | ✓ | | ✓ | ✓ |
| IM | | | ✓ | ✓ | ✓ | | ✓ | | ✓ | | ✓ | | |

Figure 9 (120)

| | Start | Slave Address $45 | ACK | Version ID $03 | ACK | Software Revision # | ACK | Software Version # | ACK | Checksum | H-I-G Stop |
|---|---|---|---|---|---|---|---|---|---|---|---|
| TV | | ✓ | | ✓ | | | | | | ✓ | ✓ |
| IM | | | ✓ | | ✓ | ✓ | ✓ | ✓ | ✓ | | |

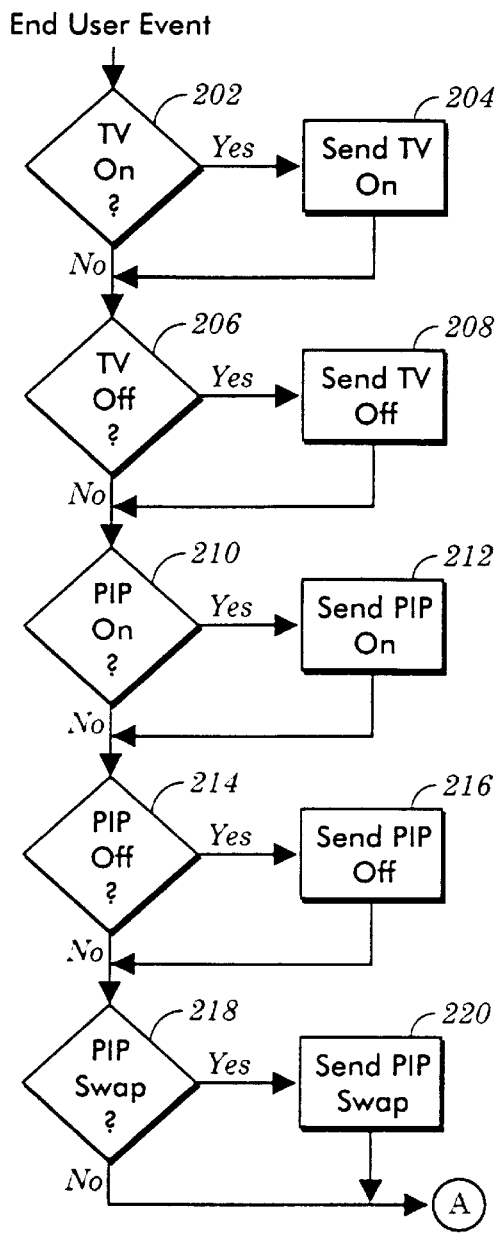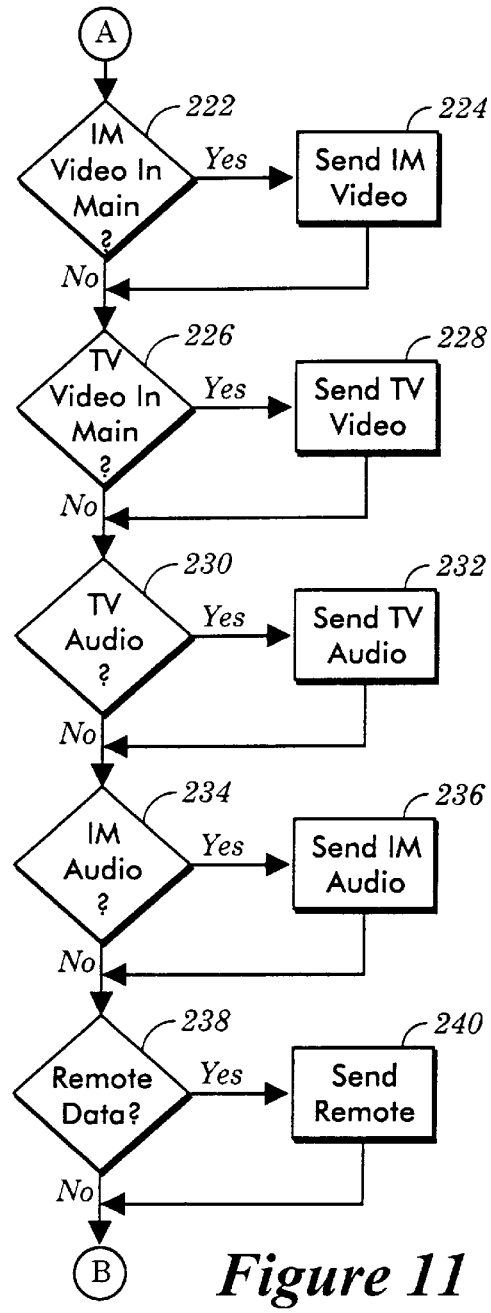
Figure 10
Figure 11

6,073,171

TWO-WAY COMMUNICATION PROTOCOL FOR A WEB TELEVISION

RELATED APPLICATIONS

The present invention is related to the inventions disclosed in application U.S. Ser. No. 08/787,654 which was filed on Jan. 23, 1997, now U.S. Pat. No. 5,977,963, in application U.S. Ser. No. 08/787,831 which was filed on Jan 23, 1997, and in application U.S. Ser. No. 08/787,662 which was filed on Jan. 23, 1997 now U.S. Pat. No. 5,844,552.

TECHNICAL FIELD OF THE INVENTION

The present invention relates to a protocol between a television controller and an internet module of a web television.

BACKGROUND OF THE INVENTION

The internet has become an integral part in the way in which content is delivered to end users. For example, newspapers, magazines, and television and cable networks have web sites that are increasingly being used to deliver content. Content is delivered by on-line content providers which include, for example, web sites and on-line service providers such as AOL™.

Content is accessed by end users via on-line access devices. The on-line access device most often used currently is the personal computer. However, non-personal-computer on-line access devices are being, and have been, developed that enable end users to connect to the internet. For example, one type of non-personal-computer on-line access device is a web television.

A web television generally includes many of the components of a conventional television, such as a television controller, a video processor, an audio processor, and the like. However, unlike a conventional television, a web television also includes an internet module, which permits the web television to be used as an on-line access device, and an input device, which permits the user to interface with the internet module and the web television in order to communicate over the internet by way of the web television. Accordingly, a web television may be used in a manner similar to a personal computer in order to gain access to on-line content providers.

The television controller of a web television currently responds to inputs from the end user in order to control the web television in either a normal television mode or an internet mode. During the television mode, the television controller responds to instructions from the end user, usually by way of a remote control, in order to select and display television signals by way of the television's display and speakers. During the internet mode, the television controller transmits messages to the internet module permitting the internet module to be used in order to communicate over the internet.

However, the television controllers of existing web televisions do not receive messages from their corresponding internet modules. Accordingly, the television controllers cannot determine the status of their corresponding internet modules, the software version numbers and revision numbers of the software being executed by their corresponding internet module, and other characteristics of the internet module which would be useful to the television controller.

The present invention solves one or more of the above noted problems by providing a protocol which supports two-way communication between a television controller and an internet module of a web television.

SUMMARY OF THE INVENTION

In accordance with one aspect of the present invention, a communication system for a web television comprises internet transmitting and receiving means and television controlling means. The internet transmitting and receiving means transmits and receives internet communications. The television controlling means controls a television so as to display the internet communications and television video to a user. The television controlling means is arranged to transmit information to, and receive information from, the internet transmitting and receiving means.

In accordance with another aspect of the present invention, a web television comprises a display, a two-way communication bus, an internet module, and a television controller. The internet module is coupled to the two-way communication bus and is arranged to support internet communications between the web television and on-line content providers. The television controller is coupled to the two-way communication bus and is arranged to selectively control display of the internet communications and television signals on the display. The television controller is arranged to transmit messages to, and to receive messages from, the internet module over the two-way communication bus.

In accordance with yet another aspect of the present invention, a web television comprises a display, an internet module, a PIP module, a video processor module, an audio processor module, a two-way communication bus, and a television controller. The internet module is arranged to support internet communications between the web television and on-line content providers. The PIP module is arranged to supply video to a PIP area of the display. The video processor module is arranged to supply video to the display. The audio processor module is arranged to supply audio to a speaker of the web television. The two-way communication bus interconnects the internet module, the PIP module, the video processor module, the audio processor module, and the television controller. The television controller is arranged to control the internet module, the PIP module, the video processor module, and the audio processor module so as to selectively display the internet communications and television signals on the display, and the television controller is arranged to transmit messages to, and to receive messages from, the internet module over the two-way communication bus.

BRIEF DESCRIPTION OF THE DRAWINGS

These and other features and advantages of the present invention will become more apparent from a detailed consideration of the invention when taken in conjunction with the drawings in which:

FIG. 3 illustrates a message format of a status command message written by the television controller to the internet module of FIG. 2;

FIG. 4 illustrates a message format of a data page command message written by the television controller to the internet module of FIG. 2;

FIG. 5 illustrates a message format of a trakball position command message written by the television controller to the internet module of FIG. 2;

FIG. 6 illustrates a message format of a keyboard page command message written by the television controller to the internet module of FIG. 2;

FIG. 7 illustrates a message format of a controller version command message written by the television controller to the internet module of FIG. 2;

FIG. 8 illustrates a message format of a status response message read by the television controller from the internet module of FIG. 2;

FIG. 9 illustrates a message format of an internet module response message read by the television controller from the internet module of FIG. 2; and, FIGS. 10–13 illustrate a program which is executed by the television controller in writing messages to, and reading messages from, the internet module of FIG. 1.

DETAILED DESCRIPTION

Figure 1:
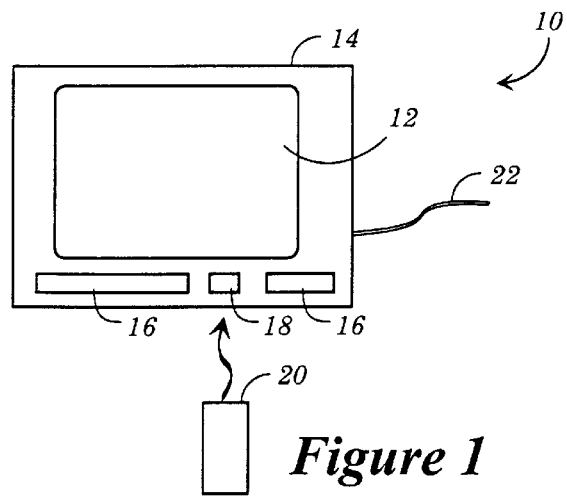
FIG. 1 illustrates a web television arranged in accordance with the present invention.

A web television 10 is illustrated in FIG. 1 and includes a display 12 (such as a CRT) housed in a cabinet 14. The cabinet 14 also houses various switches 16 as well as an infrared sensor 18 that responds to an infrared remote control device 20. Alternatively, the remote control device 20 may be hardwired to the web television 10, or the remote control device 20 may transmit wireless signals of a kind other than infrared. The remote control device 20 may be a trakball type remote control, a conventional remote control, a keyboard type remote control, or the like.

A communication medium 22 is connected to the web television 10 permitting the web television 10 to communicate with on-line content providers such as by way of the internet. The communication medium 22 may be a phone line, a cable, an integrated services digital network, a digital subscriber line (which may include an asymmetrical digital subscriber line, a rate adapted digital subscriber line, or the like), a satellite link, or any other type of medium which supports communication between the web television 10 and on-line content providers.

Figure 2:
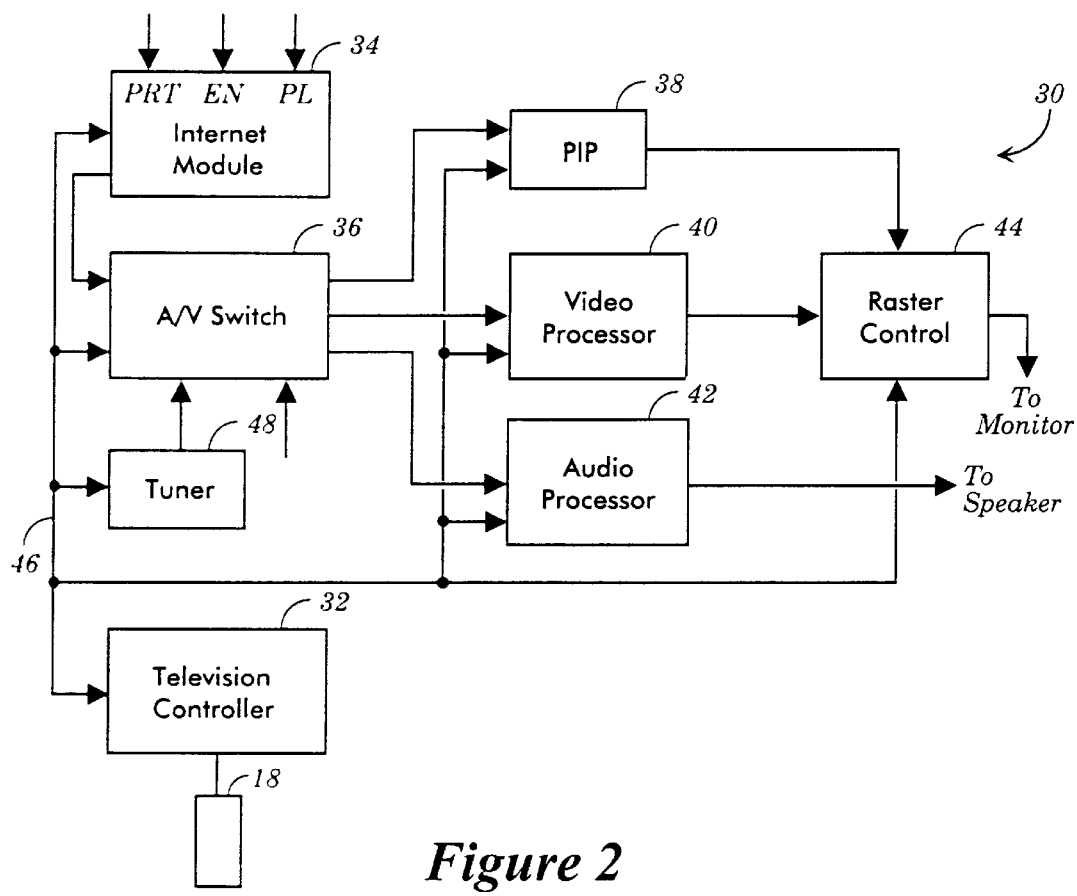
FIG. 2 illustrates a communication system having an internet module and a television controller for controlling the web television of FIG. 1.
Figure 12:
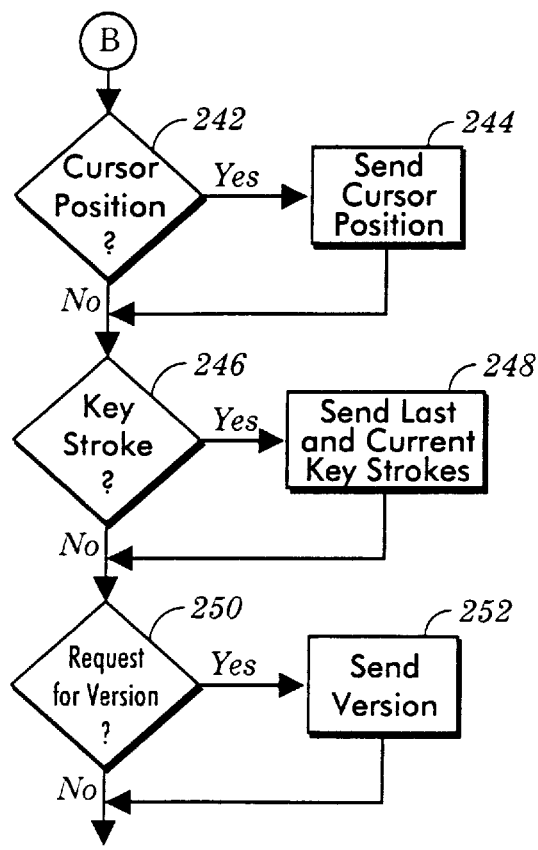
Figure 13:
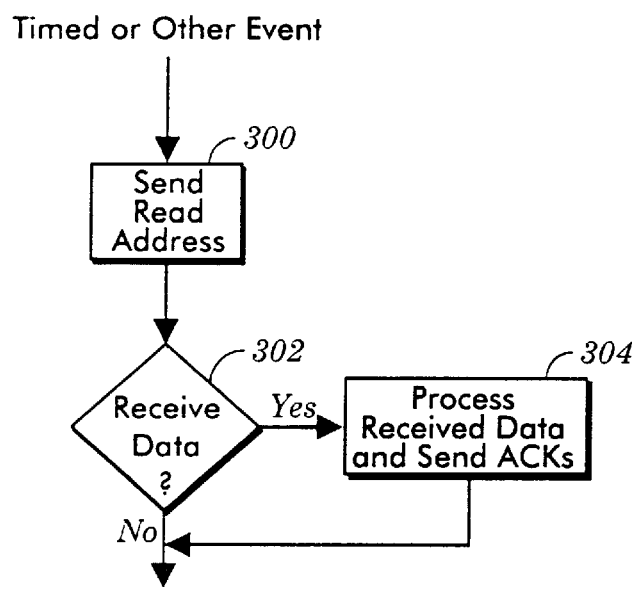

A television control system 30 for controlling the operations of the web television 10 is illustrated in FIG. 2. The television control system 30 includes a television controller 32, an internet module 34, an audio/video switch 36, a PIP module 38, a video processor 40, an audio processor 42, a raster control 44, a communication bus 46, and a tuner 48. The internet module 34 may be any of the suitable commercially available devices that permit communication between a television and on-line content providers. The internet module 34 has an Ethernet port EN and a phone line port PL for connecting the internet module 34 to the communication medium 22 so that the internet module 34 may transmit and receive information to and from remote on-line devices. The internet module 34 also has a port PRT for connecting the internet module 34 to a printer so that internet communications may be printed.

The television controller 32 may be a microprocessor with corresponding memory and communication circuits for supporting communications over the communication bus 46 between the television controller 32, the internet module 34, the audio/video switch 36, the PIP module 38, the video processor 40, the audio processor 42, the raster control 44, and the tuner 48. The communication circuit of the television controller 32 includes a transmitter and a receiver. The communication bus 46 may be an IIC communication bus having serial control, data, and address lines.

The audio/video switch 36 is controlled by the television controller 32 in order to supply internet communications, which are supported by the internet module 34, and/or television signals, which are tuned by the tuner 48, to the PIP module 38, to the video processor 40, and to the audio processor 42. The PIP module 38, the video processor 40, the audio processor 42, and the raster control 44 are controlled by the television controller 32 in order to appropriately supply the internet communications and television signals to the display 12 and the speakers of the web television 10.

Accordingly, the television controller 32, in response to appropriate signals from the remote control device 20, may control the audio/video switch 36, the PIP module 38, the video processor 40, the audio processor 42, and the raster control 44 so that (i) internet video is displayed on the display 12 and audio supported by the internet module 34 is provided to the speakers of the web television 10, (ii) television video is displayed on the display 12 and audio selected by the tuner 48 is provided to the speakers of the web television 10, (iii) internet video supported by the internet module 34 is displayed on the display 12 and television audio selected by the tuner 48 is provided to the speakers of the web television 10, (iv) internet audio supported by the internet module 34 is provided to the speakers and television video selected by the tuner 48 is displayed on the display 12 of the web television 10, (v) internet video supported by the internet module 34 is displayed in a PIP area of the display 12, television video selected by the tuner 48 is displayed in the main area of the display 12, and either internet audio or television audio is provided to the speakers of the web television 10, and/or (vi) television video selected by the tuner 48 is displayed in a PIP area of the display 12, internet video supported by the internet module 34 is displayed in the main area of the display 12, and either internet audio or television audio is provided to the speakers of the web television 10. The television controller 32, in response to appropriate signals from the remote control device 20, may also control the audio/video switch 36, the PIP module 38, the video processor 40, the audio processor 42, and the raster control 44 to swap internet video and television video between the PIP area and the main area, and to swap the speaker of the web television 10 between internet audio and television audio.

Alternatively, a swapping function may be initiated by the internet module 34. For example, when the web television 10 is in internet mode so that an internet screen is displayed on the display 12, a button on the internet screen may be selected by the user through use of the remote control device 20 causing the internet module 34 to send a request for a PIP swap to the television controller 32. In response, the television controller 32 suitably controls the audio/video switch 36, the PIP module 38, the video processor 40, the audio processor 42, and the raster control 44 to swap internet video and television video between the PIP area and the main area, and/or to swap the speaker of the web television 10 between internet audio and television audio. As another example, when the web television 10 is in internet mode, the internet module 34 may determine that the reception of an internet communication is taking too long and, until reception is complete, is appropriating the main television unnecessarily. Accordingly, the internet module 34 may send a request for a PIP swap to the television controller 32 causing the television controller 32 to swap internet video to the PIP area and television video to the main area, and/or to swap the speaker of the web television 10 from internet audio to television audio, so that the user need not be bothered with the internet communication until its reception is complete.

The communication bus 46 supports two-way communication between the internet module 34 and the television controller 32. Examples of messages which may be used during such communication are shown in FIGS. 3–9 as messages 60, 70, 80, 90, 100, 110, and 120. During communication between the television controller 32 and the internet module 34, the television controller 32 operates as a master station by controlling communication between the television controller 32 and the internet module 34 over the communication bus 46.

Accordingly, as shown by each of the messages 60, 70, 80, 90, 100, 110, and 120, the television controller 32 initiates each communication between itself and the internet module 34 by transmitting a start signal, which may be a bit or bit sequence and which designates the start of the messages 60, 70, 80, 90, 100, 110, and 120, followed by an appropriate slave address. The slave address (i) specifies the address of a module (such as the internet module 34), and (ii) designates whether the television controller 32 is writing to the communication bus 46 (i.e., transmitting) or reading from the communication bus 46 (i.e., receiving).

As shown by each of the messages 60, 70, 80, 90, and 100 of FIGS. 3–7, a write slave address having a particular value, such as $44, is transmitted by the television controller 32 when the television controller 32 writes a message to the communication bus 46 and the message is intended for the internet module 34. As shown by each of the messages 110 and 120 of FIGS. 8 and 9, a read slave address having a particular value, such as $45, is transmitted by the television controller 32 when the television controller 32 determines to read information on the communication bus 46 from the internet module 34. After the television controller 32 transmits the start signal followed by the slave address, the television controller 32 waits for an acknowledgement (ACK) from the internet module 34.

The message 60 illustrated in FIG. 3 is transmitted to the internet module 34 whenever the television controller 32 has status information to transmit, such as in the event that (i) a change occurs which affects a mode bit in the message 60 (these mode bits are described below), (ii) the television controller 32 receives a request from the internet module 34, in which case the message 60 is transmitted by the television controller 32 as an acknowledgement of the request, (iii) the internet module 34 fails to respond to a poll from the television controller 32 for a predetermined amount of time, (iv) the television controller 32 receives a command from the user which switches the television controller 32 in or out of internet mode, or the like.

Upon receipt of an acknowledgement (ACK) from the internet module 34, the television controller 32 transmits a status command byte (which may have a value of $00, for example) to indicate that the message 60 is a status message containing certain status information. This status information indicates to the internet module 34 the status of certain modes of the web television 10. The television controller 32 then waits to receive from the internet module 34 an acknowledgement of the command byte. Upon receiving this acknowledgement, the television controller 32 transmits a mode byte.

The mode byte, for example, may be eight bits in length and may be used for a variety of purposes. The mode byte may have (i) a first bit which indicates whether the web television 10 is off or on, (ii) a second bit which indicates a television receiver configuration or model, (iii) a third bit which indicates whether the main area of the display 12 is to contain internet video received by the internet module 34 or television video of a television signal selected by the tuner 48, (iv) a fourth bit which indicates whether the speakers of the web television 10 are supplied with internet audio received by the internet module 34 or television audio of a television signal selected by the tuner 48, (v) a fifth bit which indicates whether the PIP module 38 is on or off, (vi) a sixth bit which indicates whether a screen saver mode is on or off, and (vii) two bits for the like purposes.

The information contained in these mode bits may indicate the results of commands from the end user by way of the television controller 32 or from the internet module 34. For example, if the end user desires to place internet video in the main area of the display 12 and to place television video in the PIP area of the display 12, the end user will do so by use of the remote control device 20 which causes the television controller 32 to send commands in order to control the audio/video switch 36, the PIP module 38, the video processor 40, the audio processor 42, the raster control 44, and/or the tuner 48, as appropriate. The results of these control actions affect the mode bits, causing the television controller 32 to send the message 60 to the internet module 34. As another example, the internet module 34 may transmit a request to the television controller 32 that internet video be placed in the main area of the display 12 and that television video be placed in the PIP area of the display 12. Such a request may result from a selection by the end user of an appropriate button in an internet screen supplied to the display 12 by the internet module 34. As a result of the request, the television controller 32 sends commands to control the audio/video switch 36, the PIP module 38, the video processor 40, the audio processor 42, the raster control 44, and/or the tuner 48, as appropriate. This action also affects the mode bits, causing the television controller 32 to send the message 60 to the internet module 34 as an acknowledgement of the request transmitted by the internet module 34 to the television controller 32.

Following transmission of the mode byte, the television controller 32 waits for an acknowledgement from the internet module 34. Upon receipt of the acknowledgement, the television controller 32 transmits a request byte which, for example, may be used to request the internet module 34 (i) to transmit back its version ID (which may be useful for diagnostic purposes), (ii) to reset the internet module 34 (such as when the web television 10 is turned off by the end user, when the internet module 34 fails to acknowledge the communication bus 46 for more than a predefined limit of time, or when the internet module 34 otherwise requires reset), or the like. A request that the internet module 34 reset itself causes the internet module 34 to transmit back a status message indicating compliance.

After transmittal of the request byte, the television controller 32 waits for an acknowledgement. Upon receipt of the acknowledgement, the television controller 32 transmits a stop signal (such as a bit or bit sequence) designating the end of the message 60.

The messages 70, 80, and 90 are illustrated in FIGS. 4, 5, and 6. The messages 70, 80, and 90 are similar to the message 60 of FIG. 3 in that the messages 70, 80, and 90 are initiated with a start signal followed by the write slave address indicating that information is to be transmitted by the television controller 32 to the internet module 34. Upon receipt of an acknowledgement from the internet module 34, the television controller 32 transmits a remote control command byte (which may have a value of $01, for example) to indicate that the messages 70, 80, and 90 contain remote control information which has been transmitted by the remote control device 20 to the television controller 32 and which may be useful to the internet module 34. After acknowledgement of this remote control command byte, the television controller 32 next transmits a remote control page byte which indicates that certain remote control page information follows.

For example, as shown in FIG. 4, the remote control page byte of the message 70 is a data page byte (containing a value of $09, for example) to indicate that the message 70 includes a data byte. After transmitting the remote control data page byte, the television controller 32 waits for an acknowledgement. Upon receipt of the acknowledgement, the television controller 32 transmits the data byte. The data byte may be used to transmit trakball push (click) data in the case where the remote control device 20 has a trakball and the trakball has been pushed, enter key push (click) data in the case where the remote control device 20 has an enter key and the enter key has been pushed, and the like. After transmittal of the data byte, the television controller 32 waits for an acknowledgement from the internet module 34. Upon receipt of the acknowledgement, the television controller 32 transmits a stop signal designating the end of the message 70.

The message 80, which is shown in FIG. 5, is transmitted by the television controller 32 in order to convey displacement information to the internet module 34. For example, the displacement information transmitted in the message 80 may include the x and y position of a cursor or highlighting or the like, as selected by movement of a trakball on a trakball type remote control. As another example, the displacement information transmitted in the message 80 may include the x and y position of a cursor or highlighting or the like, as selected by arrow keys on either a conventional remote control, a keyboard remote control, or a trakball remote control.

The message 80 includes the start signal, the write slave address, the remote control command byte, and the remote control page byte described above. However, unlike the remote control page byte of the message 70, the remote control page byte of the message 80 is an X-Y position page byte (containing a value of $14, for example) to indicate that displacement information is contained in the message 80. Accordingly, as indicated in FIG. 5, upon receipt of an acknowledgement following transmission of the remote control page byte, the television controller 32 transmits X and Y position bytes. The X position byte designates a current X position of a cursor, highlighting, or the like, as selected by a trakball, by arrow keys, or the like. The Y position byte similarly designates a current Y position of a cursor, highlighting, or the like, as selected by a trakball, by arrow keys, or the like. Upon receipt of an acknowledgement after transmission of each of the X and Y position bytes, the television controller 32 transmits a stop signal designating the end of the message 80.

The message 90, which is shown in FIG. 6, is transmitted by the television controller 32 in order to convey alpha and/or numeric character data or the like to the internet module 34. For example, when the web television 10 is in internet mode and the remote control device 20 transmits characters (such as alpha and/or numeric characters) to the web television 10, the television controller 32 responds by transmitting the characters to the internet module 34 by way of the message 90. The message 90 includes the start signal, the write slave address, the remote control command byte, and the remote control page byte described above. However, unlike the remote control page bytes of the messages 70 and 80, the remote control page byte of the message 90 is a keyboard page byte (containing a value of $15, for example) to indicate that character data is contained in the message 90. Accordingly, as indicated in FIG. 6, upon receipt of an acknowledgement following transmission of the remote control page byte, the television controller 32 transmits the last keystroke followed by the current keystroke. Following suitable acknowledgements, the television controller 32 transmits a stop signal designating the end of the message 90.

The television controller 32 transmits a message 100 as illustrated in FIG. 7 in order to convey to the internet module 34 the revision and version numbers of the television controller 32. The message 100 includes the start signal and the write slave address described above. Following acknowledgement of the write slave address byte by the internet module 34, the television controller 32 transmits a version command byte in the message 100. The version command byte of the message 100 (containing a value of $04, for example) indicates that the message 100 contains the revision and version numbers of the television controller 32. The revision and version numbers of the television controller 32 may be useful to the internet module 34 in determining which of its features are compatible with the software executed by the television controller 32 and, therefore, should be initialized.

As indicated above, when the television controller 32 is ready to read information which it previously requested from the internet module 34, or when the television controller 32 is ready to poll the internet module 34, it transmits a read slave address over the communication bus 46. Accordingly, as shown in FIGS. 8 and 9, this read slave address may have a value of $45, for example. The internet module 34 will then return the previously requested information and/or its status in a message format such as that shown in FIGS. 8 and 9.

The message 110 shown in FIG. 8 includes a start signal, as described above, and a read slave address, both of which are transmitted by the television controller 32. Generally, a read slave address, which does not follow a previous request by the television controller 32 for specific information from the internet module 34 (such as version and revision numbers), indicates that the television controller 32 is polling the internet module 34. Following transmission of the start signal and the read slave address, the television controller 32 waits for an acknowledgement from the internet module 34 and an additional byte which, for example, may have a status indicating byte as shown in FIG. 8 or a version indicating byte as shown in FIG. 9.

In the message 110, a status indicating byte (containing a value of $00, for example) indicates that mode and status information bytes follow. The mode byte in the message 110 may be used to indicate certain information such as (i) whether the internet module 34 is active and has been initialized, (ii) whether the internet module 34 is connected to a phone line or whether the internet module is offline, (iii) whether the internet module 34 is connected to the Ethernet, and (iv) other possible information such as whether the internet module 34 is executing Web Browser, Email, User Setup, or other applications. Following receipt of the status indicating and mode bytes, the television controller 32 transmits corresponding acknowledgements and then waits for a status byte.

The status byte received by the television controller 32 may indicate whether internet audio or television audio is being supplied to the speaker of the web television 10, whether a Screen Saver mode of the internet module 34 is on or off, and the like. Following receipt of the status byte, the television controller 32 transmits an acknowledgement and waits for a request byte.

The request byte from the internet module 34 may request the television controller 32 to perform one or more of the following functions: (i) transmit its version ID; (ii) execute a PIP swap function; (iii) execute a PIP off function; (iv) execute a PIP on function; (v) switch the video output of the internet module 34 into the main area of the display 12; (vi) switch the video output of the tuner 48 into the main area of the display 12; and the like.

Many of these requests result when the user, by use of the remote control device 20 for example, clicks on an appropriate button of an internet screen which the internet module 34 causes to appear on the display 12 of the web television 10. The click information is transmitted by the television controller 32 in the messages 70, 80, and 90, as appropriate, and the selected buttons are then transmitted by the internet module 34 to the television controller 32 as requests so that the television controller 32 can take appropriate action with respect to the audio/video switch 36, the PIP module 3S, the video processor 40, the audio processor 42, and the raster control 44. Additionally, the television controller 32 transmits the message 100 to the internet module 34 in response to function (i) above, and the television controller 32 transmits the message 60 to the internet module 34 in response to functions (ii), (iii), (iv), (v), (vi), and the like.

Following receipt of the request byte, the television controller 32 transmits an acknowledgement and waits for a checksum byte. All messages which are sent from the internet module 34 to the television controller 32 over the communication bus 46 may use a checksum at the end of the message for detection of transmission errors. This checksum may be the two's complement of the sum of all bytes transmitted in the message, not including the device address. In this way, the sum of all bytes following the device address will be zero. If this checksum is not zero, the message will not be processed by the television controller 32 and the television controller 32 will require a retransmission of the message from the internet module 34. Following receipt of the checksum byte, the television controller 32 transmits a HIGH line level followed by a stop signal.

The message 120 as illustrated in FIG. 9 is transmitted so that the internet module 34 may respond to the message 60 having its request byte set to request version and revision numbers from the internet module 34. The message 120 includes the start signal and the read slave address of the message 110. Following transmission of the start signal and the read slave address, the television controller 32 waits for an acknowledgement followed by a byte having a value indicating that version identification information from the internet module 34 follows. For example, this byte may have a value of $03. Following receipt of this version identification indicating byte, the television controller 32 transmits, to the internet module 34, an acknowledgement that it has received the version identification indicating byte.

Upon receipt of this acknowledgement, the internet module 34 transmits a software revision number byte. Following receipt of the software revision number byte, the television controller 32 transmits an acknowledgement and then waits for a software version byte.

Upon receipt of this acknowledgement, the internet module 34 transmits the software version number byte. Following receipt of the software version number byte, the television controller 32 transmits an acknowledgement and then waits for a checksum byte.

Following receipt of the checksum byte, the television controller 32 transmits a HIGH line level and a stop signal.

FIGS. 10–13 illustrate an example of a program 200 which may be executed by the television controller 32 in order to facilitate the transmission and reception of the messages 60–120 over the communication bus 46. The program 200, for the most part, is an event-initiated program. In general terms, the events are either user-selected events (for example, events selected by the user through use of the remote control device 20) or polling events. In the case of user-selected events, a block 202 determines whether the event is an user instruction to turn on the web television 10. If so, a block 204 transmits messages to the tuner 48, the audio/video switch 36, the video processor 40, and the audio processor 42 to begin displaying video and audio on the web television 10. The block 204 also transmits, to the internet module 34, the message 60 with the first bit of the message 60 set to indicate that the web television 10 is on.

A block 206 determines whether the event is an user instruction to turn off the web television 10. If so, a block 208 transmits messages to the audio/video switch 36, the video processor 40, the audio processor 42, and the tuner 48 to turn off the web television 10. The block 208 also transmits, to the internet module 34, the message 60 with the first bit of the message 60 set to indicate that the web television 10 is off.

A block 210 determines whether the event is an user instruction or an internet module 34 request to turn on the PIP area. If so, a block 212 transmits a message to the PIP module 38 in order to initiate PIP operation. The block 212 also transmits, to the internet module 34, the message 60 with the fifth bit of the message 60 set to indicate that PIP operation has been initiated.

A block 214 determines whether the event is an user instruction or an internet module 34 request to turn off the PIP area. If so, a block 216 transmits a message to the PIP module 38 in order to conclude PIP operation. The block 216 also transmits, to the internet module 34, the message 60 with the fifth bit of the message 60 set to indicate that PIP operation has been concluded.

A block 218 determines whether the event is an user instruction or an internet module 34 request to perform a PIP swap. If so, a block 220 transmits a message to the audio/video switch 36 in order to swap video between the PIP area and the main area of the display 12. The block 220 also transmits, to the internet module 34, the message 60 with the third bit of the message 60 set to indicate that internet video or television video, as appropriate, is in the main area of the display 12.

A block 222 determines whether the event is an user instruction or an internet module 34 request to place internet video from the internet module 34 in the main area of the display 12. If so, a block 224 transmits a message to the audio/video switch 36 in order to place internet video from the internet module 34 in the main area of the display 12. The block 224 also transmits, to the internet module 34, the message 60 with the third bit of the message 60 set to indicate that internet video from the internet module 34 should be in the main area of the display 12.

A block 226 determines whether the event is an user instruction or an internet module 34 request to place television video from the tuner 48 in the main area of the display 12. If so, a block 228 transmits a message to the audio/video switch 36 in order to place television video from the tuner 48 in the main area of the display 12. The block 228 also transmits, to the internet module 34, the message 60 with the third bit of the message 60 set to indicate that television video from the tuner 48 should be in the main area of the display 12.

A block 230 determines whether the event is an user instruction to connect television audio from the tuner 48 to the speakers of the web television 10. If so, a block 232 transmits a message to the audio/video switch 36 in order to connect television audio from the tuner 48 to the speakers of the web television 10. The block 232 also transmits, to the internet module 34, the message 60 with the fourth bit of the message 60 set to indicate that television audio from the tuner 48 is connected to the speakers of the web television 10.

A block 234 determines whether the event is an user instruction to connect internet audio from the internet module 34 to the speakers of the web television 10. If so, a block 236 transmits a message to the audio/video switch 36 in order to connect internet audio from the internet module 34 to the speakers of the web television 10. The block 236 also transmits, to the internet module 34, the message 60 with the fourth bit of the message 60 set to indicate that internet audio from the internet module 34 is connected to the speakers of the web television 10.

A block 238 determines whether the event is a click of a trakball of a trakball remote control device 20, of an enter key of a keyboard or other remote control device 20, or the like. If so, a block 240 sends the message 70 to the internet module 34 to indicate the click. A block 242 determines whether the event is a change in cursor position as selected by use of a trakball of a trakball remote control device 20, by arrow keys of a keyboard or other remote control device 20, or the like. If so, a block 244 transmits the message 80 in order to transmit the displacement information to the internet module 34. A block 246 determines whether the event is a key stroke of a keyboard remote control device 20. If so, a block 248 transmits the message 90 in order to transmit the last keystroke and the current keystroke to the internet module 34.

A block 250 determines whether the event is a request from the internet module 34 for the version of the software executed by the television controller 32. If so, a block 252 transmits, to the internet module 34, the message 100 containing the revision and version numbers of the software executed by the television controller 32.

Polling is a timed event. When a timed event occurs, or if the television controller 32 otherwise determines to read information from the internet module 34, a block 300 initiates the transmission of an appropriate message such as the message 110 or the message 120. A block 302 awaits the receipt of the bytes subsequent to the read slave address byte of the message 110 or the message 120. As each byte subsequent to the read slave address byte of the message 110 or the message 120 is received by the television controller 32, a block 304 appropriately processes the received data and transmits acknowledgements.

Certain modifications of the present invention have been discussed above. Other modifications will occur to those practicing in the art of the present invention. For example, each portion of the messages 60, 70, 80, 90, 100, 110, and 120 is described above as a single byte. Instead, each portion of the messages 60, 70, 80, 90, 100, 110, and 120 may be comprised of several bytes or one or more other data units.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A communication system for a web television comprising:
    internet transmitting and receiving means for transmitting and receiving internet communications; and,
    television controlling means for controlling a television so as to display the internet communications and television video to a user, wherein the television controlling means is arranged to transmit information to, and receive information from, the internet transmitting and receiving means, wherein at least some of the information includes information regarding the operation of a remote control, wherein the information is transmitted and received in messages, wherein the messages have an address portion, and wherein the address portion indicates whether the television controlling means is writing or reading.

2. The communication system of claim 1 wherein the television controlling means is arranged to receive an acknowledgement following transmission of the address portion.

3. The communication system of claim 1 wherein the address portion indicates an address of the internet transmitting and receiving means.

4. The communication system of claim 1 wherein the address portion of one message indicates that the one message is a write message, wherein the one message further has a command portion and an information portion, and wherein the command portion indicates a type of information in the information portion written to the internet transmitting and receiving means.

5. The communication system of claim 4 wherein the command portion indicates that the type of information in the information portion is status information, and wherein the information portion contains the status information written to the internet transmitting and receiving means.

6. The communication system of claim 4 wherein the command portion indicates that the type of information in the information portion is click information relating to a click of the remote control, and wherein the information portion contains the click information written to the internet transmitting and receiving means.

7. The communication system of claim 4 wherein the command portion indicates that the type of information in the information portion is displacement information relating to displacement information transmitted by the remote control, and wherein the information portion contains the displacement information written to the internet transmitting and receiving means.

8. The communication system of claim 4 wherein the command portion indicates that the type of information in the information portion is character information relating to character selections by use of the remote control, and wherein the information portion contains the character information written to the internet transmitting and receiving means.

9. The communication system of claim 8 wherein the character information includes a last selected character and a current selected character.

10. The communication system of claim 4 wherein the command portion indicates that the type of information in the information portion is software version information relating to a version of software executed by the television controlling means, and wherein the information portion contains the software version information written to the internet transmitting and receiving means.

11. The communication system of claim 4 wherein the television controlling means is arranged to receive an acknowledgement following transmission of each of the address portion, the command portion, and the information portion written to the internet transmitting and receiving means.

12. The communication system of claim 1 wherein the address portion of one message indicates that the one message is a read message, wherein the one message further has a type portion and an information portion, and wherein the type portion indicates a type of information in the information portion read from the internet transmitting and receiving means.

13. The communication system of claim 12 wherein the type portion indicates that the type of information in the information portion is status information, and wherein the information portion contains the status information read from the internet transmitting and receiving means.

14. The communication system of claim 12 wherein the type portion indicates that the type of information in the information portion is software version information relating to a version of software executed by the internet transmitting and receiving means, and wherein the information portion contains the software version information read from the internet transmitting and receiving means.

15. The communication system of claim 12 wherein the television controlling means is arranged to receive an acknowledgement following transmission of the address portion and to transmit an acknowledgement following reception of each of the type portion and the information portion.

16. A web television comprising:
   a display;
   a two-way communication bus;
   an internet module coupled to the two-way communication bus, wherein the internet module is arranged to support internet communications between the web television and internet content providers; and,
   a television controller coupled to the two-way communication bus, wherein the television controller is arranged to selectively control display of the internet communications and television signals on the display, and wherein the television controller is arranged to transmit messages to, and to receive messages from, the internet module over the two-way communication bus, wherein the messages indicate whether the television controller is writing to, or reading from, the two-way communication bus.

17. The web television of claim 16 wherein the messages have an address portion, and wherein the address portion indicates whether the television controller is writing to, or reading from, the two-way communication bus.

18. The web television of claim 17 wherein the television controller is arranged to receive an acknowledgement following transmission of the address portion by the television controller.

19. The web television of claim 17 wherein the address portion indicates an address of the internet module.

20. The web television of claim 17 wherein the address portion of one message indicates that the one message is a write message, wherein the one message further has a command portion and an information portion, and wherein the command portion indicates a type of information in the information portion written to the internet module over the two-way communication bus.

21. The web television of claim 20 wherein the command portion indicates that the type of information in the information portion is status information, and wherein the information portion contains the status information written to the internet module over the two-way communication bus.

22. The web television of claim 20 wherein the command portion indicates that the type of information in the information portion is click information relating to a click of a remote control, and wherein the information portion contains the click information written to the internet module over the two-way communication bus.

23. The web television of claim 20 wherein the command portion indicates that the type of information in the information portion is displacement information relating to displacement information transmitted by a remote control, and wherein the information portion contains the displacement information written to the internet module over the two-way communication bus.

24. The web television of claim 20 wherein the command portion indicates that the type of information in the information portion is character information relating to character selections by use of a remote control, and wherein the information portion contains the character information written to the internet module over the two-way communication bus.

25. The web television of claim 24 wherein the character information includes a last selected character and a current selected character.

26. The web television of claim 20 wherein the command portion indicates that the type of information in the information portion is software version information relating to a version of software executed by the television controller, and wherein the information portion contains the software version information written to the internet module over the two-way communication bus.

27. The web television of claim 20 wherein the television controller is arranged to receive an acknowledgement following transmission of each of the address portion, the command portion, and the information portion written to the internet module over the two-way communication bus.

28. The web television of claim 17 wherein the address portion of one message indicates that the one message is a read message, wherein the one message further has a type portion and an information portion, and wherein the type portion indicates a type of information in the information portion read from the internet module over the two-way communication bus.

29. The web television of claim 28 wherein the type portion indicates that the type of information in the information portion is status information, and wherein the information portion contains the status information read from the internet module over the two-way communication bus.

30. The web television of claim 28 wherein the type portion indicates that the type of information in the information portion is software version information relating to a version of software executed by the internet module, and wherein the information portion contains the software version information read from the internet module over the two-way communication bus.

31. The web television of claim 28 wherein the television controller is arranged to receive an acknowledgement following transmission of the address portion and to transmit an acknowledgement following reception of each of the type portion and the information portion.

32. A web television comprising:
   a display;
   an internet module, wherein the internet module is arranged to support internet communications between the web television and on-line content providers;
   a PIP module, wherein the PIP module is arranged to supply video to a PIP area of the display;
   a video processor module, wherein the video processor module is arranged to supply video to the display;
   an audio processor module, wherein the audio processor module is arranged to supply audio to a speaker of the web television;
   a two-way communication bus interconnecting the internet module, the PIP module, the video processor module, the audio processor module, and a television controller; and, wherein the television controller is arranged to control the internet module, the PIP module, the video processor module, and the audio processor module so as to selectively display the internet communications and television signals on the display, and wherein the television controller is arranged to transmit messages to, and to receive messages from, the internet module over the two-way communication bus.

33. The web television of claim 32 wherein the messages have an address portion, and wherein the address portion indicates whether the television controller is writing to, or reading from, the two-way communication bus.

34. The web television of claim 33 wherein the television controller is arranged to receive an acknowledgement following transmission of the address portion by the television controller.

35. The web television of claim 33 wherein the address portion indicates an address of the internet module.

36. The web television of claim 33 wherein the address portion of one message indicates that the one message is a write message, wherein the one message further has a command portion and an information portion, and wherein the command portion indicates a type of information in the information portion written to the internet module over the two-way communication bus.

37. The web television of claim 36 wherein the command portion indicates that the type of information in the information portion is status information, and wherein the information portion contains the status information written to the internet module over the two-way communication bus.

38. The web television of claim 36 wherein the command portion indicates that the type of information in the information portion is click information relating to a click of a remote control, and wherein the information portion contains the click information written to the internet module over the two-way communication bus.

39. The web television of claim 36 wherein the command portion indicates that the type of information in the information portion is displacement information relating to displacement information transmitted by a remote control, and wherein the information portion contains the displacement information written to the internet module over the two-way communication bus.

40. The web television of claim 36 wherein the command portion indicates that the type of information in the information portion is character information relating to character selections by use of a remote control, and wherein the information portion contains the character information written to the internet module over the two-way communication bus.

41. The web television of claim 40 wherein the character information includes a last selected character and a current selected character.

42. The web television of claim 36 wherein the command portion indicates that the type of information in the information portion is software version information relating to a version of software executed by the television controller, and wherein the information portion contains the software version information written to the internet module over the two-way communication bus.

43. The web television of claim 36 wherein the television controller is arranged to receive an acknowledgement following transmission of each of the address portion, the command portion, and the information portion written to the internet module over the two-way communication bus.

44. The web television of claim 33 wherein the address portion of one message indicates that the one message is a read message, wherein the one message further has a type portion and an information portion, and wherein the type portion indicates a type of information in the information portion read from the internet module over the two-way communication bus.

45. The web television of claim 44 wherein the type portion indicates that the type of information in the information portion is status information, and wherein the information portion contains the status information read from the internet module over the two-way communication bus.

46. The web television of claim 44 wherein the type portion indicates that the type of information in the information portion is software version information relating to a version of software executed by the internet module, and wherein the information portion contains the software version information read from the internet module over the two-way communication bus.

47. The web television of claim 44 wherein the television controller is arranged to receive an acknowledgement following transmission of the address portion and to transmit an acknowledgement following reception of each of the type portion and the information portion.

48. The web television of claim 16 wherein the message has a command portion and an information portion, and wherein the command portion indicates a type of information in the information portion written to the internet module over the two-way communication bus.

49. The web television of claim 48 wherein the command portion indicates that the type of information in the information portion is status information, and wherein the information portion contains the status information written to the internet module over the two-way communication bus.

50. The web television of claim 48 wherein the command portion indicates that the type of information in the information portion is click information relating to a click of a remote control, and wherein the information portion contains the click information written to the internet module over the two-way communication bus.

51. The web television of claim 48 wherein the command portion indicates that the type of information in the information portion is displacement information relating to displacement information transmitted by a remote control, and wherein the information portion contains the displacement information written to the internet module over the two-way communication bus.

52. The web television of claim 48 wherein the command portion indicates that the type of information in the information portion is character information relating to character selections by use of a remote control, and wherein the information portion contains the character information written to the internet module over the two-way communication bus.

53. The web television of claim 52 wherein the character information includes a last selected character and a current selected character.

54. The web television of claim 16 wherein the message has a type portion and an information portion, and wherein the type portion indicates a type of information in the information portion read from the internet module over the two-way communication bus.

55. The web television of claim 54 wherein the type portion indicates that the type of information in the information portion is status information, and wherein the information portion contains the status information read from the internet module over the two-way communication bus.

* * * * *